(12) United States Patent
White

(10) Patent No.: US 6,888,991 B2
(45) Date of Patent: May 3, 2005

(54) SINGLE-MODE FIBER SYSTEMS

(75) Inventor: Ian A. White, Dunwoody, GA (US)

(73) Assignee: Fitel USA Corp., Norcross, GA (US)

( * ) Notice: Subject to any disclaimer, the term of this patent is extended or adjusted under 35 U.S.C. 154(b) by 207 days.

(21) Appl. No.: 10/407,355

(22) Filed: Apr. 4, 2003

(65) Prior Publication Data

US 2004/0197060 A1 Oct. 7, 2004

(51) Int. Cl.[7] .................................................. G02B 6/16
(52) U.S. Cl. ........................ 385/123; 385/129; 385/128
(58) Field of Search ............................... 385/123–129, 385/27–29, 37

(56) References Cited

U.S. PATENT DOCUMENTS

| | | | |
|---|---|---|---|
| 4,641,914 A | * | 2/1987 | Sheem ........................ 385/29 |
| 6,131,415 A | | 10/2000 | Chang |
| 6,535,678 B1 | * | 3/2003 | Yamauchi et al. .......... 385/123 |
| 2004/0194512 A1 | * | 10/2004 | Hong et al. ................... 65/402 |

* cited by examiner

*Primary Examiner*—Akm Enayet Ullah
*Assistant Examiner*—Kevin S. Wood

(57) ABSTRACT

Single-mode optical fiber systems, incorporating fiber of core radius of sufficient size to support the fundamental mode together with from one to three higher order modes, exhibit performance/cost advantages relative to systems based on traditional single-mode fiber.

13 Claims, 4 Drawing Sheets

SINGLE-MODE FIBER SYSTEMS

FIELD OF THE INVENTION

Optical fiber systems based on single-mode fiber.

BACKGROUND OF THE INVENTION

Commonly used optical fiber is: silica-based; of outside dimension ~125 microns ($\mu$m); with "up-doped" core; and often undoped cladding. Initially introduced multimode fiber, with its core size of 25–50 $\mu$m, now occupies but a niche position—that of short and intermediate distance communications with operation at the nominal system wavelength of 850 $\mu$m. At this time, longer-distance communications is based on single-mode fiber—structure of the same outside diameter, but now of reduced core size. Single-mode fiber, with its 1–6 $\mu$m radius core, is designed to support solely the first or "fundamental" mode. Higher-order modes, not present in the initially-launched laser pulse, but yielded, e.g., by encounter with unintended scattering centers, are not supported in such core structures, and, accordingly, are ultimately radiated from the fiber. (Content of such spurious higher-order modes—continuously generated by encounter with fresh scattering centers, and continuously removed by radiation—in usual single-mode structures, attains some small steady-state population that may be ignored for most purposes.)

Single-mode fiber and systems, in retaining dominance, have undergone many iterations. Usual single-mode systems are based on laser transmitters operating at wavelengths in either of two low-loss wavelength regions associated with the silica-based glass of generally-used optical fiber. Operation had, for some years, been at the nominal system wavelength of 1310 nanometers (nm), defining one such region. Nature looked kindly on 1310 nm operation, in offering fiber of generally low dispersion, as desired for small pulse-spreading and permitted high bit-rates. (Following accepted design principles for 1310 nm fiber, the two opposite-sign contributions to total chromatic dispersion—the "waveguide dispersion" associated with the design of the fiber, and the "material dispersion" associated with the bulk characteristic of the glass composition itself—substantially compensate.)

Operation within the lower-loss 1550 nm region, however was complicated by relatively high levels of chromatic dispersion and consequent limitation on bit-rate. That problem was solved by introduction of Dispersion Shifted Fiber (DSF), which, with its larger waveguide dispersion, enabled compensation of the larger material dispersion at that wavelength. DSF was, in turn, displaced by Non Zero Dispersion Fiber (NZDF), e.g., TrueWave® fiber, with its precisely-determined small but finite value of chromatic dispersion, balancing the needs of Wavelength Division Multiplexing (WDM) (dispersion both sufficiently large for periodic phase cancellation to control Four Wave Mixing (4WM) responsible for channel-to-channel cross-talk, and sufficiently small to limit pulse spreading and enable high per-channel bit-rate). (With total absence of chromatic dispersion, DSF assured identical phase velocity for all WDM channels, thereby avoiding phase-cancellation, allowing unlimited buildup of spurious signal, and precluding the increased capacities expected from multi-channel operation.) Use of NZDF has permitted demonstration of a 40-channel, single mode fiber system, of trillion bit/sec capacity.

Existing single-mode systems fall into three categories: 1. Enterprise Networks (Campus Local Area Networks or "LANs")—of span lengths 1–3 kilometers (km), and Subscriber Distribution (connecting the central office to the subscriber)—of span lengths 1–20 km; 2. Metropolitan Networks (linking nearby central offices)—of span lengths 5–40 km; and 3. Long-distance networks—typically of span length up to 100 km before signal amplification or regeneration.

Likely improvements in future single-mode systems will address economic issues, as well as performance. Small mode field radius (MFR), implicit in traditional single-mode fiber, leads to high power density in the fiber core, thereby increasing consequence of non-linearities, restricting introduced power and, accordingly, limiting distance between optical amplifiers. The same consideration impacts the number of channels in a WDM channel set. Small core size imposes a high degree of needed precision, both in fiber fabrication and in system installation—all with cost implications. Substantial macrobending susceptibility imposes space constraints, requiring extensive storage space. Significant microbending susceptibility, with resulting cabling loss, limits choice of fiber coatings—requires now-prevalent dual coatings (with soft inner coating to buffer the fiber from inner surface roughness, and harder outer coating for abrasion-resistance). The same dual coatings increase space requirements in cable design and in required duct space.

Fabrication advances have been impressive. Intractability of the high-melting, and, consequently easily-contaminated, silica-based fiber, has yielded to suitable manufacturing processes, which maintain product within extremely tight compositional, dimensional, and purity specifications. Low-loss dopants/doping processes, for tailoring index-of-refraction and imparting wanted light-guiding properties, have been developed.

Common manufacturing processes are: Modified Chemical Vapor Deposition (MCVD); Outside Vapor Deposition (OVD); and Vapor Axial Deposition (VAD). Described, e.g., in *Optical Fiber Telecommunications*, S. E. Miller and A. G. Chynoweth, 1979, Academic Press, Chapter 8, all react gaseous silicon halide-containing material with oxygen to produce an initial particulate, silica-containing "soot" body, of carefully-controlled composition, which is, thereafter consolidated to yield the body, constituting at least the critical core precursor, from which the fiber is ultimately drawn. MCVD and OVD achieve critical core profiling by means of layer-by-layer, longitudinal deposition of thin, uniform-composition layers of material—with layer-by-layer composition changed or unchanged, containing index-increasing or index-decreasing dopant, as needed. Preform preparation may entail further processing such as etch-removal of temporary substrate—of the outer MCVD deposition tube or the OVD mandrel. Resulting hollow MCVD and OVD bodies are collapsed to make the solid preform. MCVD manufacture often incorporates a cost-reducing procedure, by which the deposited body is placed within an outer cladding tube, of less critical, relatively inexpensive material, to produce the (composite) preform. VAD depends on "end-on" growth of compositionally-graded material.

Co-pending U.S. Patent Applications

Co-pending patent application "Optical Fiber For Single-Mode Operation," Ser. No. 10/407,376, filed on even date herewith and assigned to the assignee of this application, and which is hereby incorporated by reference, describes and claims a novel single-mode fiber structure, "Enhanced Single-Mode Fiber" (ESMF). In accordance with that application, mode-stripping of higher-order modes enables single-mode operation in fiber cores of sufficient size for limited multimode operation (for "few-mode" operation)—in fiber cores of sufficient size to support a limited number—generally a total of from two to four modes at a system wavelength. Fiber of that invention benefits from larger core size relative to traditional design, as well as from greater wavelength transmission capability (now for operation over a spectrum including wavelengths below cutoff in traditional design). The mode-stripping phenomenon, common to all species, is an outgrowth of a proposed remedy for bandwidth loss in early multimode fiber—i.e., the "mode-mixing" phenomenon, dependent on successive perturbations in refractive index along the fiber, as "seen" by a travelling pulse. Such fiber perturbations were proposed for encouraging mode conversion among the supported core modes, thereby "averaging" traversal times for the various modes, limiting pulse spreading, and improving bandwidth. Commercial use of such perturbed fiber has been limited due to added loss in signal strength accompanying the intended mode-mixing.

Another co-pending patent application, "Enhanced Multimode Fiber," Ser. No. 10/408,476, filed on even date herewith and assigned to the assignee of this application, addresses that added loss, and, thereby, reinstates mode-mixing as a viable mechanism for alleviating the bandwidth reduction due to mode dispersion. Mode dispersion, recognized as originating with generation of spurious modes by scattering centers, was to have been alleviated by vastly increasing incidence of mode conversion (of "mode coupling" between modes), so that modes making up an individual pulse of light would have spent an equal amount of time as every other mode, thereby averaging modal traversal time. This co-pending application first identifies the added signal loss as due to unwanted coupling with "cladding modes" (with modes of such high order as not to be supported in the fiber core—therefore, ultimately to be lost by radiation from the fiber). The claimed Enhanced Multimode Fiber (EMF) avoids this added loss by decoupling a final core mode, thereby arresting step-wise coupling of modal energies with cladding modes.

ESMF depends on a corollary of the EMF thesis—rather than preventing coupling with cladding modes, it provokes coupling of all but the fundamental mode with cladding modes, thereby inducing loss of higher-order modes and approaching the single-mode operation of conventional single-mode fiber.

SUMMARY OF THE INVENTION

Systems of the invention incorporate ESMF, totally or partially replacing traditional single-mode fiber (TSMF), with advantages, either immediate or in planned/permitted upgrading. Not discounting possible encroachment on systems presently using multimode fiber, initial systems are expected to replace those presently using single-mode fiber—Enterprise Networks and Subscriber Distribution, Metropolitan Networks, and Long-Distance Networks. Use of ESMF in claimed systems is expected to meet requirements for the desired twenty-year or greater lifetime between media upgrades—of particular consequence in high-population areas, where installation disrupts daily activity.

Advantages, always deriving from permitted single-mode operation at a wavelength at which the core is few-moded, may be viewed as in either of two categories: 1) those based on larger core size, per se—allowing increased maximum power, and, therefore, e.g., greater span length or larger WDM channel sets, and; 2) those based on enlarged operating wavelength spectrum.

Design of inventive systems raises issues as between: performance advantage; and novel fiber design with possible cost implications. Design of first category systems offers opportunity for compromise regarding this tradeoff. Such a compromise—"hybrid" systems—may use fiber spans constituted of successive lengths of fiber of differing core size, e.g., a first length of ESMF following an amplifier, succeeded by a length of TSMF, the junction between the two at such span distance that attrition due to fiber loss has reduced signal intensity sufficiently to be tolerated by the conventional fiber. The hybrid system may be viewed as a conventional system based on TSMF for transmission (constituting subspan A), but preceded by an added subspan (subspan B). Justification is described simplistically in terms of (1) a subspan A for operation over the now-conventional maximum-to-minimum power range considered available to the system designer, as modified by (2) insertion of subspan B for operation over the now-increased power made feasible by increased core size. In these terms, junction between the two subspans is at power level ordinarily considered the maximum allowed for TSMF (at which the ESMF attrition due to insertion loss has reduced power level to the maximum considered appropriate for launching into the TSMF subspan A). A minimum fractional value for ESMF making up such a span (generally making up an "amplifier span" bounded at at least one end by an amplifier), is based on such hybrid circuitry. Claims are directed to a totality of ESMF (of whatever core diameter) constituting subspan B, e.g., of 20% of the total span length. Illustratively, circuit design following the above description, may place the ESMF-TSMF junction at the span position at which attrition has reduced power level to 200 milliwatts (mW), the value commonly assigned as maximum permitted value for TSMF circuitry. For assumed conditions, including: inserted power level of 400 mW; doubling of MFD in the ESMF; and insertion loss in span B of 6 dB, this might correspond with ESMF constituting 24% of the span.

Other considerations may dictate hybrid systems in which juncture is at a different power level—e.g., at lower power level (than the usually-prescribed TSMF launch power) to take advantage of other ESMF attributes such as improved macrobending performance. The same approach may result in one or more intermediate subspans using ESMF of successively reduced core size (as permitted by attrition-reduced power levels).

Active consideration now being given Raman amplification-based optical amplifiers, may suggest further reason for hybrid circuitry. Where retained, the smaller TSMF core, with its greater power density, will enable more efficient Raman amplification. The same consideration might lead to further division of the TSMF subspan A into fiber segments of successively further reduced core diameter.

Expanding on the second category—no longer constrained by traditional single-mode core dimension, operation is extended to include (single-mode) operation over the range of shorter wavelengths, 800–900 nm and to 600 nm, until now the province of multimode operation. Introduction of fiber without the pronounced water peak separating the 1310 nm and 1550 nm windows, in accordance with U.S. Pat. No. 6,131,415, issued Oct. 17, 2000 and U.S. Pat. No. 6,205,268 issued Mar. 20, 2001, may result in an uninterrupted operating window including both windows. Other considerations permit extension to longer wavelengths, resulting in permitted operation over the total spectrum of 600–1700 nm.

Systems of the second category may benefit from, now-permitted, longer wavelength operation for given core size—e.g., by providing for operation at wavelengths longer than in the usually assigned 1550 nm operating range, by use of perturbed fiber, otherwise of traditional 1550 nm design.

Figure 1A:
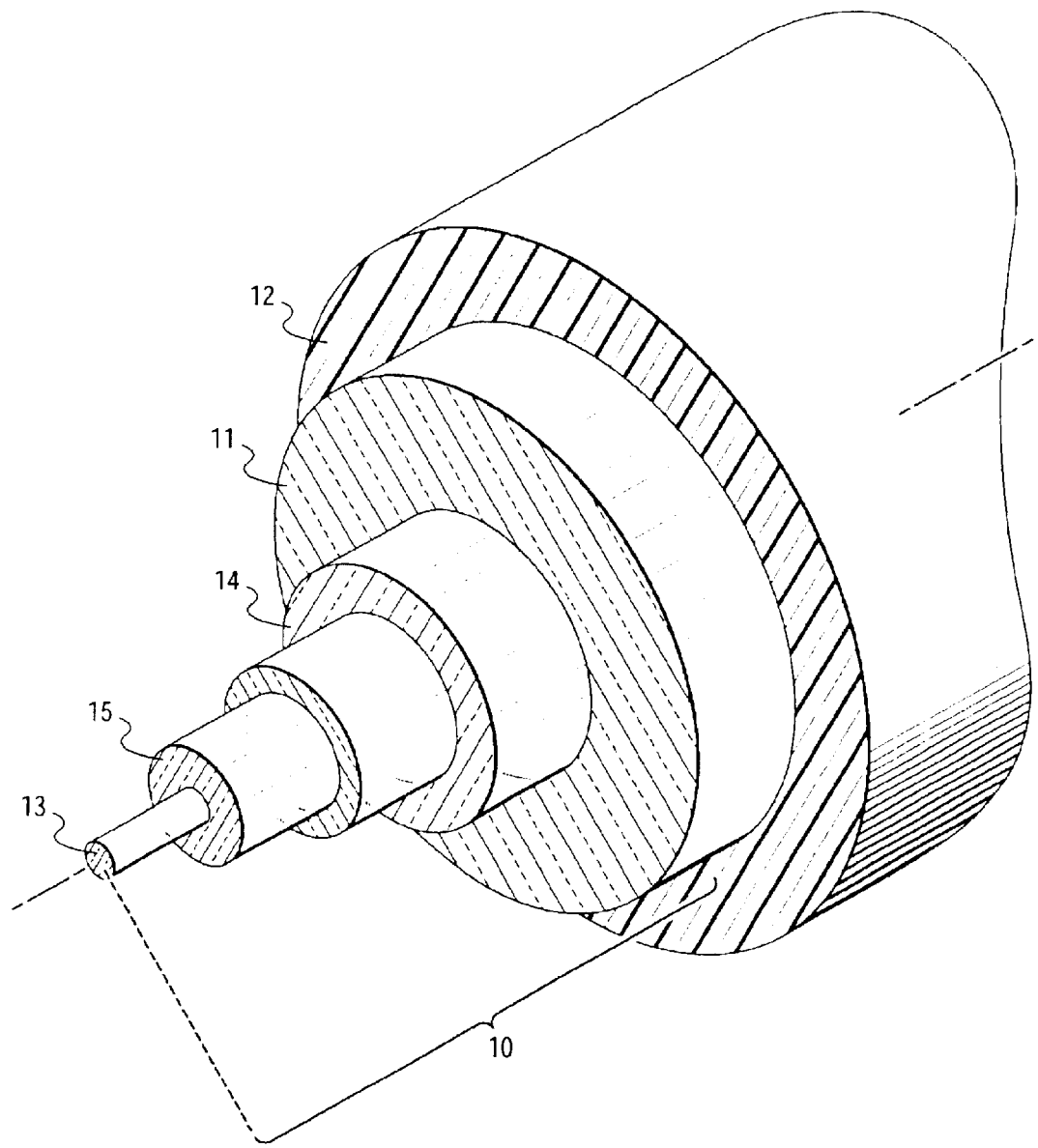
FIGS. 1a–1c are, successively, perspective view, and cross-sectional and longitudinal index-of-refraction characteristics, for an illustrative ESMF structure.

TERMINOLOGY (Terms, always consistent with such terms as commonly used in context of optical fiber, are sometimes more specific than in common usage.)

ESMF (Enhanced Single-Mode Fiber)—Designation for the fiber of co-pending patent application Ser. No. 10/407,376 "Optical Fiber For Single-Mode Operation".

Mode—Independent, self-supporting, electromagnetic field, constituted of an electric field component and a magnetic field component, that propagates axially along the optical fiber independent of all other modes. Modes are identified in accordance with the convention for describing field shape of linearly polarized modes—$LP_{m,n}$ in which "m" is the azimuthal mode number and "n" is the radial mode number.

Consistent with common practice, the term, "mode", is sometimes used as synonymous with "mode group" where suitable, e.g., where phase-velocity is described and modal members of the group are of the same phase-velocity. Unless otherwise specified, the term includes both polarizations.

Mode Group (or Grouping)—Generally refers to "degenerate" mode group, also known as "principal" mode group (next definition).

Degenerate (or Principal) Mode Group (or Grouping)—For all but the single-member fundamental mode group, constituted of separate member modes, initially of the same axial phase velocity—the term is also applied to such groupings after "splitting", in which member modal phase velocities are no longer the same. Groupings are constituted of a meridional and/or helical mode, together with one or more skew modes.

Multimode Fiber—Fiber of core size sufficient to support a plurality of bound modes—characteristically from several hundred to 2000 modes—in addition to the fundamental mode.

Few-Mode Fiber—Fiber of core size sufficient to support a small number of high order modes, illustratively from two to four modes including the fundamental mode.

Span—Without modifier, refers to length of fiber over which a signal is transmitted before amplification/regeneration.

Mode Coupling (or Mode Mixing)—Constituting, or entailing, conversion of one mode to another, including bound-to-bound and bound-to-cladding.

Mode Stripping—Elimination of modal energy contained in one or more modes, ultimately by radiation from the fiber—accomplished by coupling of a bound mode to a cladding mode.

Perturbation—Change in fiber characteristic that locally alters effective refractive index of concerned mode(s) from that in immediately preceding and succeeding fiber length, thereby provoking mode coupling—without modifier, referring to deliberately introduced changes. Study of perturbations—those constituting change in composition as well as geometry—is at an advanced level, and is reported in *Optical Waveguide Theory*, A. W. Snyder and J. D. Love, Chapman Hall, 1983.

Continuous Relationship—Within prescribed limits, an unabrupt relationship between parameter values. Used in this description, with reference to the relationship between index-of-refraction and radial position in the ESMF core, "continuous relationship" is descriptive of the prototypical step-core or profiled-core of the inventive fiber, and is intended to exclude any deliberate abrupt changes (or "features").

Excepting the on-axis index depressions characteristic of MCVD and OVD, state-of-the-art fiber manufacture permits core index values that vary from those prescribed by no more than 10% Δ over any radial distance ≦1 μm. This practice describes a preferred embodiment of the present invention.

Feature (or Index Feature)—Referring to the index-vs.-radial position profile of an optical fiber core, any deliberate, abrupt change in index in excess of 10% Δ in—preferably of at least 11% Δ—over a radial distance ≦1 μm.

Trench (or Index Trench)—Radially positioned, region outside the core, in which index-of-refraction is at least 5% Δ below that of outside (usually contiguous) cladding—generally an annular region, likely bounded by pronounced ("step") changes, i.e., by change of at least 5% Δ, occurring over a radial distance ≦2 μm at its interface with enclosed, as well as enclosing, fiber.

Effective Optical Index ("$n_{eff}$")—a computed value often used in describing mode (or mode group) properties, in accordance with:

$$n_{eff} = \beta/(2\pi/\lambda) \qquad \text{Eq. 1}$$

in which:
  β is the axial phase propagation constant
  λ is wavelength measured in free space.
The divisor, $2\pi/\lambda$, usually designated "k", is the wave number of the light.

Group Index—Derivative of β with respect to k (with $k=2\pi/\lambda$, in which λ is wavelength as measured in free space).

Core—Innermost region of the fiber with primary responsibility for guiding—constituted of material of greater index-of-refraction than that of the cladding within which it is enclosed. A common silica-based fiber structure has a germania-doped core within an undoped cladding.

The radial dimension of the core is ordinarily considered to be the dimension from the center of the fiber to the radially-measured onset of material of index equal to or less than that of the outer cladding—i.e., of index equal to or less than the "predominant cladding index", $n_{cl}$.

Δ (or Fiber Delta)—A measure of the guide strength of the fiber, in accordance with:

$$\Delta = (n_{co}^{max} - n_{cl})/n_{co}^{max} \qquad \text{Eq. 2}$$

in which:
  $n_{co}^{max}$=maximum value of refractive index in the core
  $n_{cl}$=predominant index of the cladding
Members of the primary class of ESMF structures contemplated—silica-based structures, for operation over a wavelength range including 1550 nm, characteristically of core radius of up to 12 μm—have Δ values likely within the range of 0.15–2.00%.

α Profile—Power law profile, which as defining the fiber core, follows the relationship:

$$n^2(r)=(n_{co}^{max})^2(1-2\Delta\cdot(r/a)^\alpha)$$ Eq. 3 in which:
   n(r)=refractive index at radial position, r
   r=radial position as measured from the fiber axis
   $n_{co}^{max}$=maximum value of refractive index in the core
   $\Delta=(n_{co}^{max}-n_{cl})/n_{co}^{max}$
   α=core radius Near-2α Profile—Power law profile of general form approximating that defined under "α profile", in which the value of the exponent, α, approaches 2, resulting in substantial improvement in lessening differences in modal group phase velocities relative to those in constant-index cores. For purposes of this description, this art-accepted term is set at a value in the range, e.g., 1.5–3.0.

Best Fit α Profile—Idealized α profile most closely approximating the actual profile, while disregarding deviations from Eq. 3, e.g., as unintentionally introduced during fabrication. (If such deviations are small compared to the operating system wavelength, as is often true of the "ripples" associated with the layered deposition of MCVD and OVD, guidance and transmission properties determined using "best fit" are generally accepted by system designers as descriptive of operation. By the same token, the "central dip"—the axial region of lowered index—associated with MCVD and OVD, while likely larger, has substantial effect only on the fundamental mode, so that the "best fit", ignoring the dip, offers a valid approximation for fiber design/operation.) Excepting the central dip, core profiles with all index values ±2.5% Δ of those of a mathematically perfect α profile qualify for description by "best fit".

Consistent with usual practice, "α profile" without modifier, as used in the description of a real fiber, refers to "best fit α profile".

Mathematical methods for determining best fit α profile are described, e.g., in A. H. Cherin, *An Introduction to Optical Fibers*, 1983, McGraw Hill, Chapter 8, Section 8, p. 208.

Cladding—The entirety of the fiber outside the core—in accordance with general usage, referring to the inorganic glass cladding produced during fiber drawing as an integral part of the fiber—not including applied organic coating(s).

Outer Cladding—Without further modifier, the outermost part of the cladding and, generally, the major part of the fiber mass. In the usual instance of silica-based fiber using updoped core material (e.g., silica containing germania), the outer cladding is undoped silica. Its value of refractive index is generally used in calculation of the delta ("Δ") value used as a measure of fiber guide strength.

Silica-based—Used to modify "fiber" or the material of which the fiber is composed, refers to the compositional system now extensively used in the manufacture of optical fiber. The term includes unmodified silica as well as silica that has been alloyed with other ingredient(s), generally for the purpose of changing index-of-refraction. Addition of other ingredients results in "doped silica"—either "updoped" to increase index, or "down-doped" to decrease index.

DETAILED DESCRIPTION

General

Figure 1B:
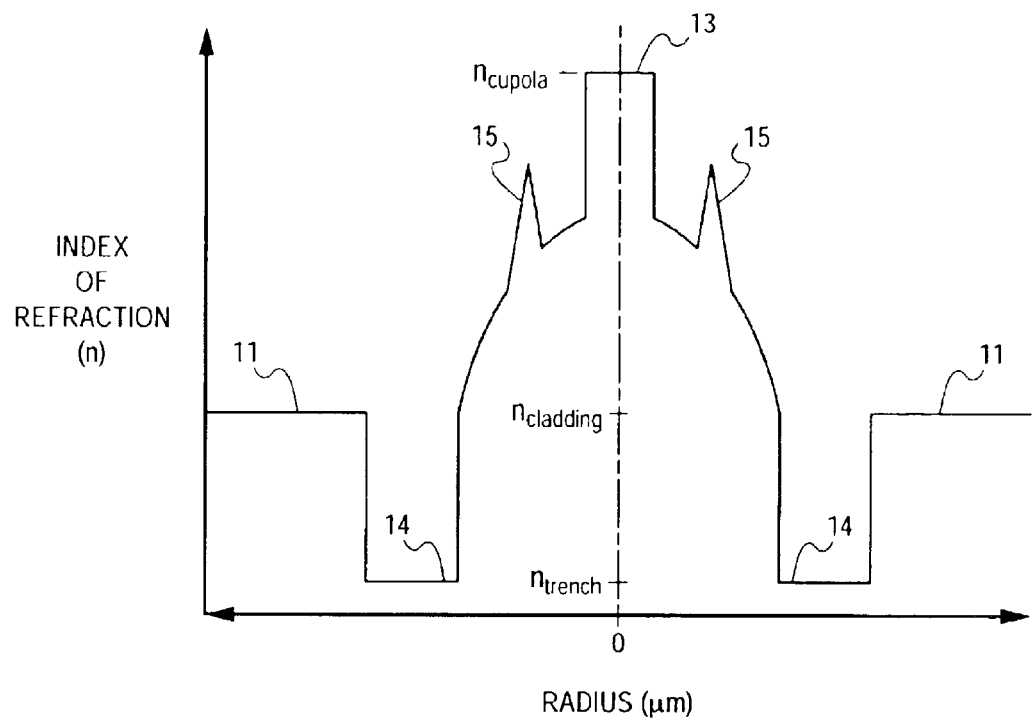
Figure 1C:
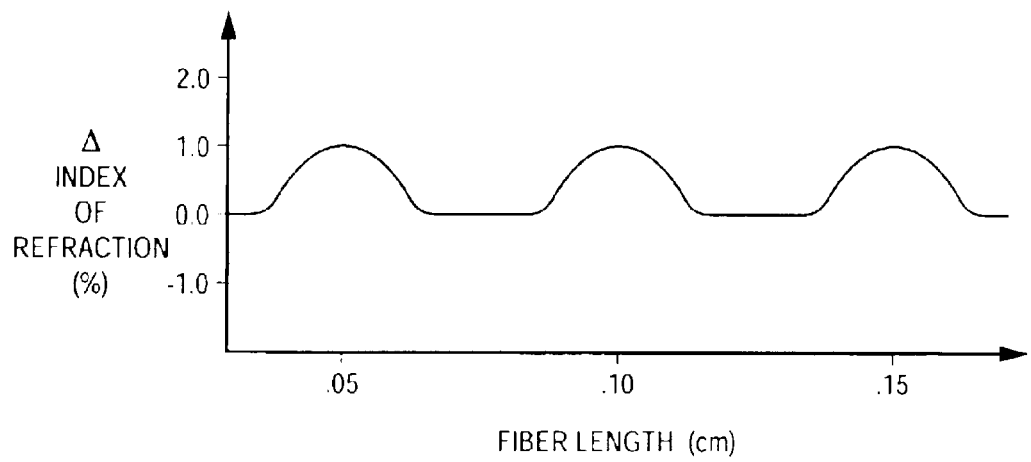

Claims are directed to optical fiber communication systems making substantial use of ESMF of co-pending patent application Ser. No. 10/407,376 "Optical Fiber For Single-Mode Operation". While reference should be made to that application for detailed description of the entire category of contemplated fiber structures, brief description of representative ESMF structures is useful here. FIGS. 1a–1c are referred to in that description.

Unless otherwise indicated, discussion contemplates a system of wavelength operating range including $\lambda_0$=1550 nm. It is likely significant commercial systems will, in the future, continue to operate within this high transparency 1550 nm "window"—including the range, 1480–1580 nm—with expanded operation over 1400–1675 nm, particularly as enabled with ESMF. Properties of ESMF are generally to be compared with those of Traditional Single-Mode Fiber (TSMF). For these purposes, TSMF is to be considered state-of-the-art single-mode fiber. As presently used in long-distance communication, TSMF is properly represented by Non-Zero Dispersion Fiber (NZDF), e.g., TrueWave® fiber.

FIG. 1a is a perspective view of an ESMF structure consisting of a core 10, cladding 11, and coating 12. It is ordinarily provided with a centrally-located core feature of increased index-of-refraction relative to remaining core—a "positive" feature, i.e., "cupola" 13—which, as located at or near the position of peak intensity for the fundamental mode, selectively increases effective index for that mode. Likely included as well, a "negative" feature, i.e., "trench" 14—at or near the position of peak intensity for the second mode—selectively decreases effective index for that mode. Together, the two features increase $\Delta n_{eff}$ as between first and second modes, lessening likelihood of loss of fundamental mode power by stepwise coupling of fundamental and cladding mode(s). Annular feature 15, centered at the radial position of greatest total light intensity of the fundamental mode, provides an added degree of flexibility in dispersion management—enables reduction in slope of the dispersion vs. $\lambda_0$ relationship.

FIG. 1b, on coordinates of index-of-refraction, n, vs. radial position (in microns) is a representative ESMF fiber profile.

FIG. 1c, on coordinates of index-of-refraction, n, and fiber length in centimeters, shows the varying index-of-refraction experienced by the traveling fundamental mode, $LP_{01}$. Illustrative perturbations of peak index greater than or equal to 1% Δ, are spaced at 0.5 mm intervals. The mathematical relationship between perturbation spacings and $\Delta n_{eff}$ values of mode pairs for which coupling is to be selectively induced is described in co-pending patent application Ser. No. 10/407,376 "Optical Fiber For Single-Mode Operation".

ESMF offers significant advantages over TSMF that will impact system design, either as implemented on installation or in future upgrading. Discussion is generally in terms of Dense Wavelength Division Multiplex (DWDM), expected to be included in systems that will be the chief beneficiary of ESMF. (Whether or not including DWDM, some system use is likely to incorporate Coarse Wavelength Division Multiplex (CWDM)—likely permitting operation of at least one channel each in each of the two transparency windows including 1310 nm and 1550 nm. In general, the considerations discussed are applicable to CWDM as well as to DWDM.) Considerations will be discussed in three sections.

A major attribute of ESMF—permitted increased core size, in turn, increased MFR—offers the designer the prospect of higher total power. This facility—increased power, without increasing consequences of nonlinearities—is utilized in terms of maximum permitted power launched into the fiber by transmitter or amplifier. Sometimes discussed in terms of an illustrative doubling of mode field, or even of mode field radius (MFR), so that launched power may be doubled or quadrupled, prospects are: 1) 12% or 24% greater distance between amplifiers; 2) twofold or fourfold increase in information content, e.g., in terms of a larger set of DWDM channels; or combination. Typical parameters for TSMF are: 100 km span length; WDM set of 100 channels (perhaps +3 dB or 2 mW/channel, or 200 mW total power). By contrast, claimed systems may operate expeditiously at twice, three or four times that power level—at 400 mW (or even at levels of 600 mW or 800 mW). The new systems may utilize that higher power tolerance: by increasing channel set size; by increase in span length; or by combination. Assuming otherwise unchanged circuit characteristics, this might permit doubling, tripling or quadrupling set size to 200, 300 or 400 channels, or increasing span length by 12%, 18% or 24% (e.g., to 112 km, 118 km or 124 km).

A second category of system advantages results as direct consequence of the perturbation stream. Introduced for purpose of mode stripping of higher-order modes—for expulsion of all but the fundamental mode, i.e., for assurance of single-mode operation in the few-mode core—a major implication concerns operating wavelength range. The fundamental objective of mode stripping, itself permits single-mode operation over a range of shorter wavelengths, precluded in TSMF (e.g., 1310 nm operation precluded in 1550 nm fiber of conventional single-mode design). In addition, extension to higher operating wavelengths is the consequence of system design, now enabled by reason of improved macrobending performance of ESMF.

Finally, this advance, like all others, must be considered for its manifold implications on system cost. Broadened wavelength operating range may effect reduction in cost-per-bit in different ways: 1) utilized to permit an increased number of channels—whether in DWDM or in CWDM—cost is decreased as direct consequence of resulting increase in signal capacity; 2) used to permit increased wavelength spacing between adjacent DWDM channels, cost of passive devices is reduced, again resulting in lower cost-per-bit. With expected further improvement in component design, ESMF will allow further cost savings in the future.

Discussed in some detail in co-pending patent application Ser. No. 10/407,376 "Optical Fiber For Single-Mode Operation". EMSF design may provide for NZDF characteristics—operation with chromatic dispersion in the range 1.5 ps/nm-km to 8.0 ps/nm-km—over the now-broadened permitted wavelength operating range. Shown on FIG. 1b, positive index, annular feature 15, centered on or near the position of highest total light intensity, results in a uniformly large change in index for a broad range of operating wavelengths, in turn, reducing slope of the dispersion vs. wavelength curve.

System Design Implications of EMSF

1. Mode Field Radius

Increased mode field radius (MFR) is of greatest significance in long haul transmission. Larger MFR means smaller light intensity for any given total power. Reduced impact of nonlinear effects, in permitting increased total maximum power, in turn permits increased span length. State-of-the-art operation at 1550 nm requires amplifier spacing of about 100 km, to accommodate expected fiber loss of about 0.25 dB/km. Each additional 3 dB of launched power permits an increase of 12 km amplifier spacing. Doubling MFR—generally attainable with use of ESMF—in allowing 6 dB reduction in power density, allows an increase of 24% in span length. Under conditions that received per-channel power is limiting, larger MFR, in permitting increased total launched power—is a factor in permitting larger WDM channel sets.

2. Wavelength Range

There are two distinct, low-loss, operating wavelength ranges in the silica-based material used in most commercial optical fiber—the first extending from 1260 nm to 1360 nm; the second from 1480 nm to 1580 nm. Absent a fiber suitable for both, the system designer has been obligated to make a choice between the two ranges. Operation at the nominal wavelength of 1550 nm—signifying operation within the second, and lowest loss range—facilitated by recent fiber advances, is the general choice, replacing earlier designs based on operation at the nominal system wavelength of 1310 nm. With ESMF, it becomes possible to design a system for simultaneous or sequential operation in both ranges.

Operation at wavelengths in between the two ranges has, until recently, been considered too lossy. In accordance with U.S. Pat. No. 6,131,415, removal of the water peak, responsible for the loss separating the 1310 nm and 1550 nm regions, provides system designers with the promise of operation over the entire wavelength range of 1250–1580 nm.

Single-mode operation at still shorter wavelengths previously has not been possible, since below cutoff frequency, has, until now, been prohibited in 1310 nm or 1550 nm transmission fiber. That prohibition is removed with the mode stripping of the ESMF perturbation stream, enabling operation within and beyond the 850 nm system wavelength, now the province of the local network. The result is permitted ESMF operation to the lower $\lambda_0$ limit of 600 nm.

Increased core size, in lessening the fractional amount of power in the cladding, for any given power, reduces loss due to macrobending in the new fiber, and, accordingly permits operation at still longer system wavelengths. Optimal TSMF design, in requiring higher cutoff wavelength to take advantage of such longer wavelength operation, would prohibit single-mode operation at shorter wavelengths. With removal of this prohibition—with mode-stripping—the long wavelength limit, too, may be extended, so that ESMF operating wavelength may extend over the entire transparency range of from 600 nm to 1700 nm. Operation in silica-based glass at still longer wavelengths, is, at this time, generally viewed as absorption-limited.

System advantages of increased wavelength operating range importantly take the form of "simultaneous" utilization—larger range of operating wavelength, $\lambda_0$ as defined by the difference $\Delta\lambda_0$ between the lowest and highest wavelength member of the DWDM channel set, or of the corresponding coarse WDM (CWDM) operating range. The designer may utilize this by increasing spacing, $\Delta\lambda_0$, between WDM channels, with implications on both amplifier spacing and cost reduction (see "3. Cost" below). Further, increased channel spacing additionally reduces magnitude of channel crosstalk—e.g., as due to Four-Wave Mixing (4WM)—thereby further lessening impact of non-linearities and so relieving this limitation on amplifier spacing. Increased range of operating wavelength makes possible a once-sought goal—that of enabling the long wavelength transmission fiber to be utilized in the local network at $\lambda_0$=850 nm.

3. Cost

Cost-per-bit, an important determinant in system design, is reduced in state-of-the-art systems taking advantage of ESMF. Cost-saving accompanies both increased MFR and increased wavelength range.

The exemplary doubling in MFR, permits a four-fold increase in total power and 24% increase in span length. For state-of-the-art 432-fiber cable, cost of amplifiers per span is $43.2 million, so that such increase in span length is equivalent to a $10 million saving in amplifiers, alone.

A current commercial offering provides for 160 WDM channels over a total wavelength range 1530–1570 nm—i.e., with channel spacing of 0.25 nm—and with span length of 100 km. Cost-per-bit, already low compared with earlier systems, may be further reduced by use of ESMF. Increased wavelength range, e.g., doubling, may be used: to increase channel spacing—e.g., to 0.5 nm, with saving largely due to reduced cost of both passive and active devices; or to increase number of channels—e.g., to 200 channels. As discussed, increased MFR may permit increased span length, e.g., to 112 km or more. Fiber cost may be impacted by adoption of ESMF—permitted increased launch power permits proportional decrease in the number of fibers needed to provide for a given power/information transfer and, accordingly, in fiber cost. As discussed in co-pending patent application "Optical Fiber For Single-Mode Operation," Ser. No. 10/407,376. Cable cost itself may be impacted by use of ESMF, e.g., as due to reduced macrobending loss, in turn, permitting higher fiber count.)

Many factors go into determination of system cost/cost saving. With ultimate cost saving dependent upon required additional cost of components—multiplexers, demultiplexers, filters, etc.—system length becomes a factor. In most instances, cost-saving is greatest for long-distance systems in which fiber cost is most consequential. In Metropolitan networks, distance between terminals is smaller—likely from 10 km to 200 km between regenerators, with more frequent need for conversion between analog and digital signal format—proportionally increasing cost.

System Types

Discussion has been largely in terms of multi-wavelength operation—DWDM and/or CWDM. A major attribute of ESMF is its permitted increased wavelength range of operation. While it is expected that major applications will be in long-distance systems presently using DWDM, ESMF may be used in systems presently designed for single wavelength operation, with such use, in part, justified by future upgrading to multichannel operation. Such prospective use is likely to concern systems in which state-of-the-art operations is not yet multichannel (i.e., Metropolitan network, Local Area Network and Distribution network).

There are two fundamental types of multi-wavelength systems. Usual optical fiber communication systems are Simplex systems—providing for unidirectional fiber traffic, and requiring a fiber pair for bidirectional communication. Since operating on separate fibers, there is no interaction between the opposite paths, and transmission direction imposes no requirement on operating wavelength. Simplex systems generally use the same or similar operating wavelength for both directions.

Systems using the alternative approach—providing for bidirectional traffic on a single fiber—are here referred to as "Duplex Systems" (intended as including "Diplex Systems", with oppositely-directed, system wavelengths closely-spaced at $\leq 10$ nm). A major reason for such "single-fiber" systems being disfavored—interaction between the two directions—has been largely intractable using TSMF. ESMF, with its increased operating wavelength spectrum, permits greater channel spacing, so that back reflections from connectors and splices are more easily filtered out, enabling better isolation of oppositely-directed channels. This attribute of ESMF is expected to make duplex operation a viable choice for the system designer—even to be preferred, e.g., where fiber cost becomes controlling.

Figure 2:
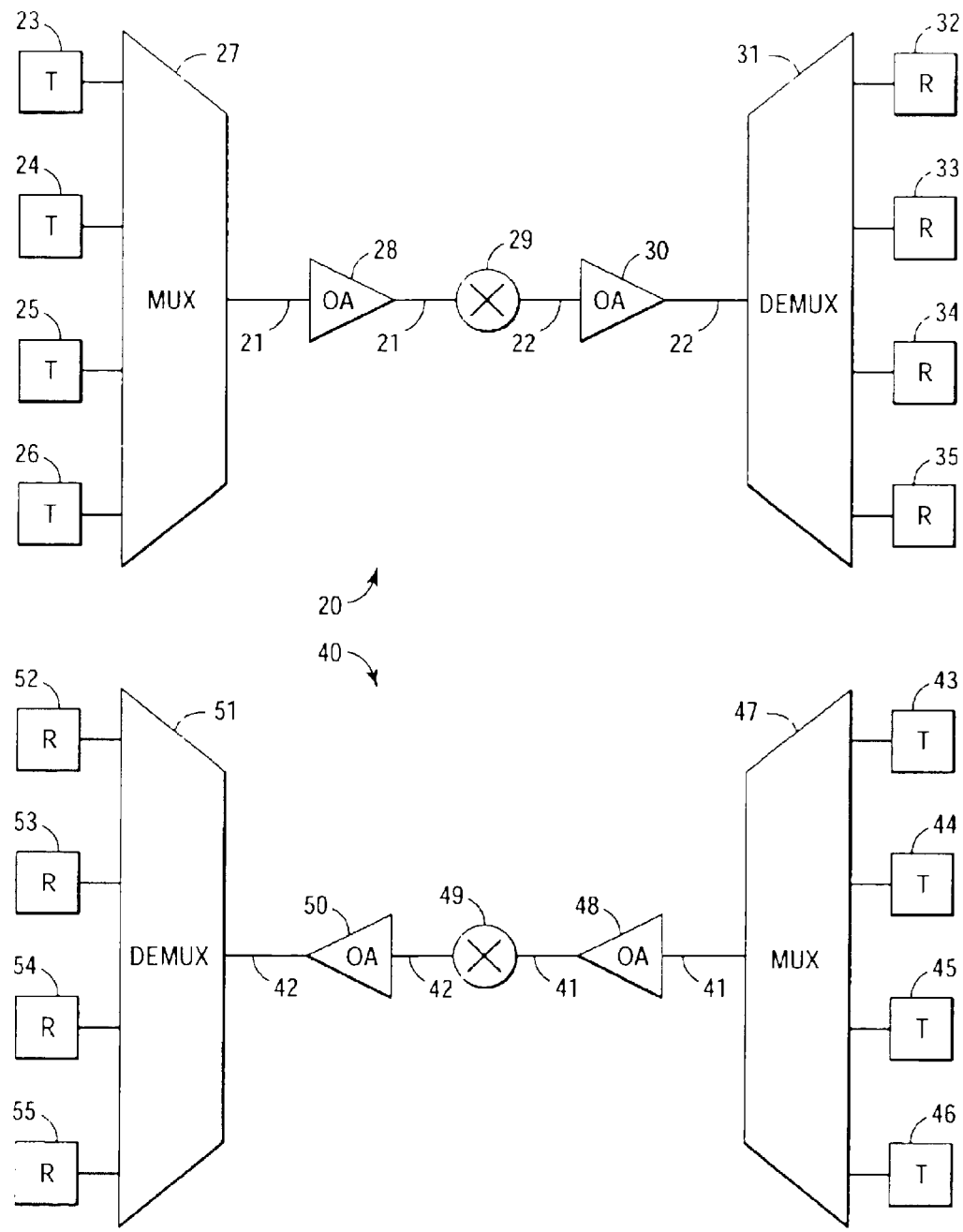
FIG. 2 is a circuit diagram of a multiplexed Simplex system, providing for oppositely-directed, unidirectional traffic on separate fiber transmission paths.
Figure 3:
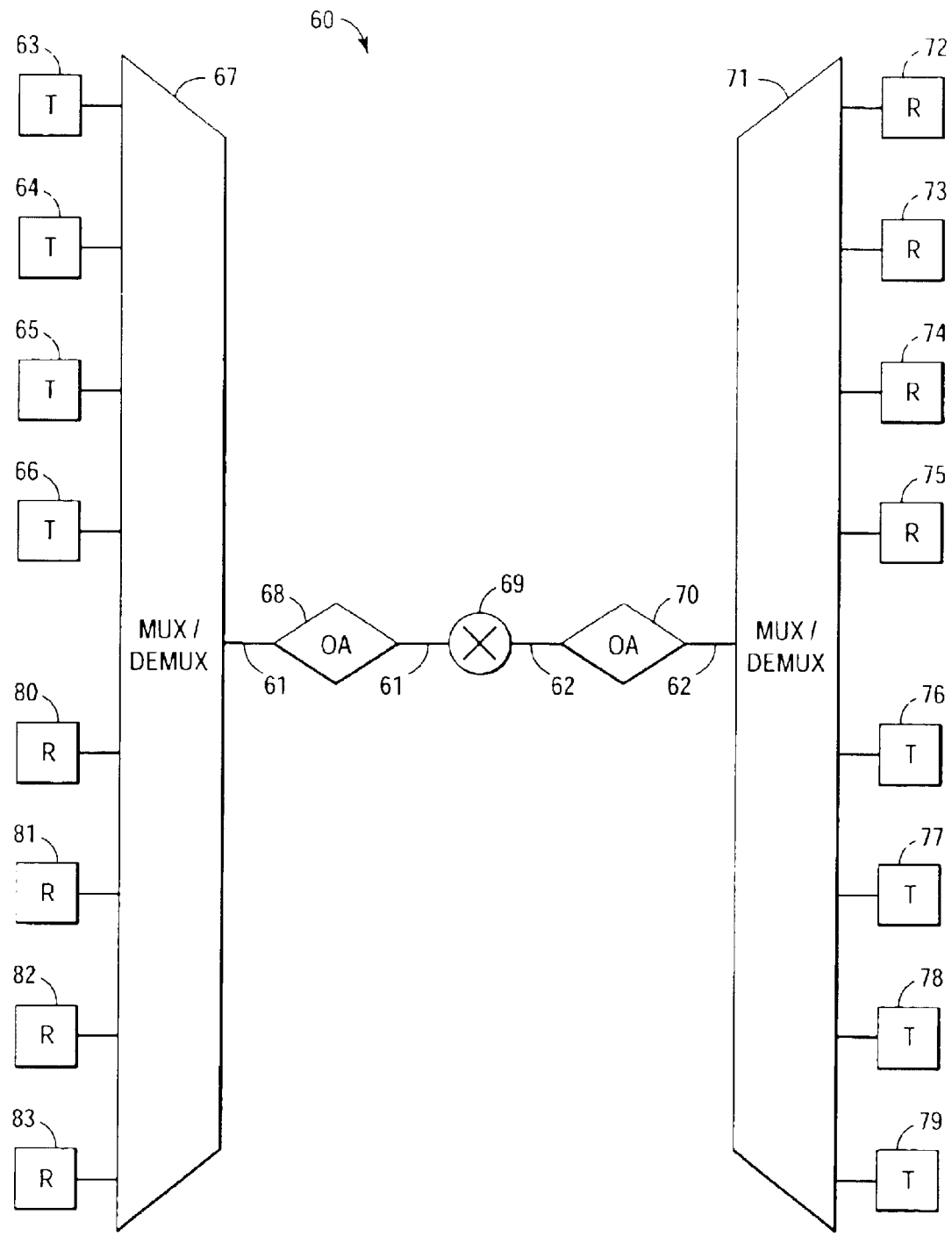
FIG. 3 is such a diagram of a multiplexed Diplex/Duplex system, providing for bidirectional traffic on a single fiber transmission path.

FIGS. 2 and 3, representative of the two major system choices, Simplex and Duplex, are discussed in general terms, intended as representative of the more important of the various contemplated systems that may beneficially incorporate ESMF—long distance, Metropolitan, LAN, and access distribution. Both assume the bidirectional communication of more general use, although unidirectional transmission, e.g., by use of circuit 20 of FIG. 2, is not discounted. Both are shown as multiplexed—certainly the more important ultimate use—although, as common in the communication industry, circuitry, as installed, may provide for this, and other features shown, only in subsequent upgrading. Relevant features—multiple transmitters and receivers, multiplexers, demultiplexers—are, accordingly, to be regarded as optional.

FIG. 2 is a schematic diagram of a multiplexed Simplex system using ESMF for at least a substantial portion of the transmission path. Two separate, unidirectional circuits, 20 and 40, provide for left-to-right and right-to-left communication, respectably. Constituent parts of the two circuits, shown as symmetrical, are numbered in accordance with function, with corresponding features numbered two decades apart.

Reference is first made to circuit 20, providing for left-to-right communication. Outputs from channel transmitters 23–26, provided with necessary elements, e.g., laser generators, providing for Electrical-to-Optical (E-O) conversion, Analog-to-Digital (A-to-D) converters, modulators, are introduced into multiplexer 27. Multiplexed signal is then launched into a fiber span shown as constituted of fiber 21, thereafter to be introduced into and amplified by optical amplifier 28. Amplified output is next transmitted over additional fiber 21. Fiber 21 is connected with fiber 22 through intermediate splice and connector point 29. Transmission continues over fiber 22, over appropriate distance before signal is introduced into optical amplifier 30, there to be amplified, to be launched into continuing fiber 22 and into demultiplexer 31. Demultiplexed signals, now corresponding with individual channels introduced by transmitters 23–26, is transferred to receivers 32–35 in which signal undergoes D-to-A conversion.

Transmission fiber 21 and 22, while possibly of identical ESMF, are separately numbered with a view to the hybrid circuitry option, discussed above. Further pursuit of that option may entail additional span subdivision—so that, e.g., fiber intermediate multiplexer 27 and optical amplifier 28 might be subdivided.

Right-to-left communication is provided by circuit 40, shown as providing for all functions of circuit 20, but in the reverse order. Accordingly, channel transmitters 43–46, together with multiplexer 47, constituting the entire transmitter assembly, introduce multiplexed signal into fiber span constituted of fiber 41, thence into optical amplifier 48, through additional fiber 41, to be connected with fiber 42, optical amplifier 50, additional fiber 42, demultiplexer 51, and individual channel receivers 52–55. Description of circuit 20 is applicable to circuit 40.

Neither diplex nor duplex operation is presently favored. Explanation entails signal transfer between the two directions, in part, due to back reflection of oppositely-directed channels by connectors and splices. Minimization of back reflections requires use of filters, expensive because of severe tolerance required by close spacing between the two directions. ESMF, in permitting greater separation in wavelength of operation for the two directions, may reduce component cost, and, accordingly, may result in Diplex/Duplex operation becoming a more viable alternative for the system designer.

FIG. 3, in depicting Duplex system 60, shows circuit elements arranged and functioning in the general order shown for the Simplex system of FIG. 2. Left-to-right communication is provided by channel transmitters 63–66, with outputs multiplexed in multiplexer/demultiplexer 67. Multiplexed signal is launched into fiber 61, to be amplified at the end of the span by bi-directional optical amplifier 68. Amplified signal is launched into continuing fiber 61, passes through splice/connector point 69, is introduced into fiber 62, is amplified within optical amplifier 70, is transmitted through continuing fiber 62, and, finally, is introduced into the receiver assembly constituted of multiplexer/demultiplexer 71 and individual channel receivers 72–75. Right-to-left communication is in the reverse order, with processed signal being produced and introduced by channel transmitters 76–79 into multiplexer/demultiplexer 71, with multiplexed signal transmitted by fiber 62, amplified by optical amplifier 70, transmitted by continuing fiber 62, through splice point 69, through fiber 61, thence amplified by optical amplifier 68, transmitted via successive fiber span 61, to unit 67 where, as demultiplexed, individual channels, are introduced into receivers 80–83.

What is claimed is:

1. Wavelength Division Multiplexed optical waveguide system providing for a "primary DWDM channel set" at a "primary system wavelength", the said system including: a transmitter, a receiver, and optical amplifiers, together with a transmission line of optical fiber including at least one fiber span,

CHARACTERIZED IN THAT a substantial length of fiber constituting such fiber span is "few-mode" fiber of core radius sufficient to support at least one high-order mode in addition to the fundamental mode at the primary system wavelength, in which the few-mode fiber includes a continuous stream of longitudinally spaced perturbations in value of index-of-refraction, of spacing to selectively extract high-order mode(s) by radiation, whereby the said few-mode fiber is effectively single-mode-operating, and in that provision is made for total launched power of at least 400 milliwatts (mW) into the said fiber span.

2. System of claim 1 in which the substantial length is at least 20% of that of the span.

3. System of claim 2, in which the said span comprises fiber providing for unidirectional communication, and in which the substantial length constitutes the initial part of the span in the signal direction.

4. System of claim 1 in which the said DWDM channel set includes at least 200 channels.

5. System of claim 4, in which the said fiber span is of length of at least 112 km.

6. System of claim 5 in which the said span comprises fiber providing for unidirectional communication, and the length of the initial part of the span is sufficient that total power is reduced by attrition to $\leq 200$ mW.

7. System of claim 6 in which fiber constituting the initial part of the span is, at least once, reduced in core radius in the signal direction.

8. System of claim 1 in which the primary system wavelength is of value within the silica low-loss region including 1550 nm.

9. System of claim 8 in which the wavelength range defined by extreme channels of the primary DWDM channel set is at least 100 nm.

10. System of claim 8 additionally providing for a "secondary signal channel" at a "secondary system wavelength".

11. System of claim 10 in which the secondary signal wavelength is within the silica low-loss region including 1310 nm.

12. System of claim 10 in which the secondary signal wavelength is within the range of 800–1250 nm.

13. System of claim 1 providing for signal transmission at a wavelength within the range 1580–1675 nm.

* * * * *